(12) United States Patent
Konrad et al.

(10) Patent No.: US 10,803,030 B2
(45) Date of Patent: Oct. 13, 2020

(54) ASYNCHRONOUS SQL EXECUTION TOOL FOR ZERO DOWNTIME AND MIGRATION TO HANA

(71) Applicant: SAP SE, Walldorf (DE)

(72) Inventors: Heiko Konrad, Hockenheim (DE);
Joerg Schoen, Nussloch (DE);
Lars-Eric Biewald, Mannheim (DE);
Juergen Specht, Gerabronn (DE)

(73) Assignee: SAP SE, Walldorf (DE)

( * ) Notice: Subject to any disclaimer, the term of this patent is extended or adjusted under 35 U.S.C. 154(b) by 734 days.

(21) Appl. No.: 14/541,581

(22) Filed: Nov. 14, 2014

(65) Prior Publication Data
US 2016/0140117 A1   May 19, 2016

(51) Int. Cl.
*G06F 16/21*   (2019.01)
(52) U.S. Cl.
CPC .................. *G06F 16/214* (2019.01)
(58) Field of Classification Search
CPC .............................. G06F 17/303; G06F 16/214
USPC .................................................. 707/608, 609
See application file for complete search history.

(56) References Cited

U.S. PATENT DOCUMENTS

| | | | |
|---|---|---|---|
| 8,356,010 B2 * | 1/2013 | Driesen ................. | G06F 16/214 707/624 |
| 2002/0161784 A1 * | 10/2002 | Tarenskeen ........... | G06F 17/303 |
| 2004/0220956 A1 * | 11/2004 | Dillon ................. | G06F 17/3056 |
| 2012/0124081 A1 * | 5/2012 | Ebrahimi .............. | G06F 17/303 707/769 |
| 2012/0324449 A1 * | 12/2012 | Huetter ................. | G06F 9/5066 718/1 |
| 2014/0279914 A1 * | 9/2014 | Bester ................... | G06F 16/273 707/640 |
| 2016/0078079 A1 * | 3/2016 | Hu ..................... | G06F 17/30371 707/803 |

FOREIGN PATENT DOCUMENTS

EP          2763055 A1 *   8/2014   ........... G06F 17/303

OTHER PUBLICATIONS

Rubarth, Boris, "DMO: downtime optimization by migrating app tables during uptime", Sep. 8, 2014, blogs.sap.com, 28 pages printed (Year: 2014).*
Chang, Nicholas, "Phases behind DMO R3load parallel export/import during Uptime and Downtime to target HANA DB", Jun. 25, 2014, blogs.sap.com, 17 pages printed (Year: 2014).*
SAP, "SAP First Guidance—migrate BW on HANA with the database migration option (DMO)", May 2015, SAP, 102 pages (Year: 2015).*

* cited by examiner

*Primary Examiner* — Tony Mahmoudi
*Assistant Examiner* — Michael Le
(74) *Attorney, Agent, or Firm* — Jones Day

(57) ABSTRACT

A system and method for database migration is provided. In an example embodiment, the database migration technique may include execution modules having a first connection to a source database and a second connection to a target database, and orchestration modules adapted to identify first and second subsets of statements from a single storage table, wherein the first and second subsets of statements are executed by the execution modules during an uptime period of the source database.

21 Claims, 5 Drawing Sheets

ASYNCHRONOUS SQL EXECUTION TOOL FOR ZERO DOWNTIME AND MIGRATION TO HANA

FIELD OF INVENTION

The present invention generally relates to systems and methods for database migration, and more particularly, to systems and methods for asynchronous structured query language (SQL) execution during zero downtime database migration.

BACKGROUND

Numerous business process applications are presently used to conduct business operations. Applications may be programs executed by an end-user to perform certain tasks. Such applications may be executed in conjunction with one or more backend systems. Example backend systems may include database systems, enterprise resource planning (ERP) systems, customer relationship management (CRM) systems, and business warehouse (BW) systems, etc. Such backend systems may store large amounts of data in a variety of formats.

By manipulating data stored within backend systems, users may generate various business process objects, such as sales orders, invoices, etc. A business object may be created using known computing systems and languages (e.g., advanced business application programming (ABAP) which is available from SAP AG, Walldorf, Germany). Such objects may be stored within backend systems. In addition, objects are typically stored using tabular format(s).

Such backend systems often require periodic maintenance. Maintenance may include several activities, such as the execution of a large number of different DB DDL (Data Definition Language) or DML (Data Manipulation Language) statements. SQL statements are a type of DML statement. Moreover, the size and complexity of backend systems may cause difficulties in migrating between platforms. For example, backend databases may include in excess of one hundred thousand tables. During a migration procedure, several statements (e.g., access permission statements) may be required for many of these tables. In addition, some database migrations may require the purchase of additional intermediate hardware resources, therefore increasing the overall cost of the migration. The complex requirements and efforts imposed by current migration tools may make some customers decide against the purchase and test of a new database.

Thus, a number of challenges may arise during migration of an existing BW or ERP system to an in-memory database system, such as SAP® high-performance analytic appliance (HANA). Migration to other database platforms, such as Sybase adaptive server enterprise (ASE), is also feasible. Accordingly, there is a need in the art for a faster and more efficient system and method for migrating existing databases between platforms. The embodiments described herein provide systems and methods for asynchronous SQL execution during zero downtime database migration.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 is a representative view illustrating a storage table according to an example embodiment of the present invention.

DETAILED DESCRIPTION

Figure 1:
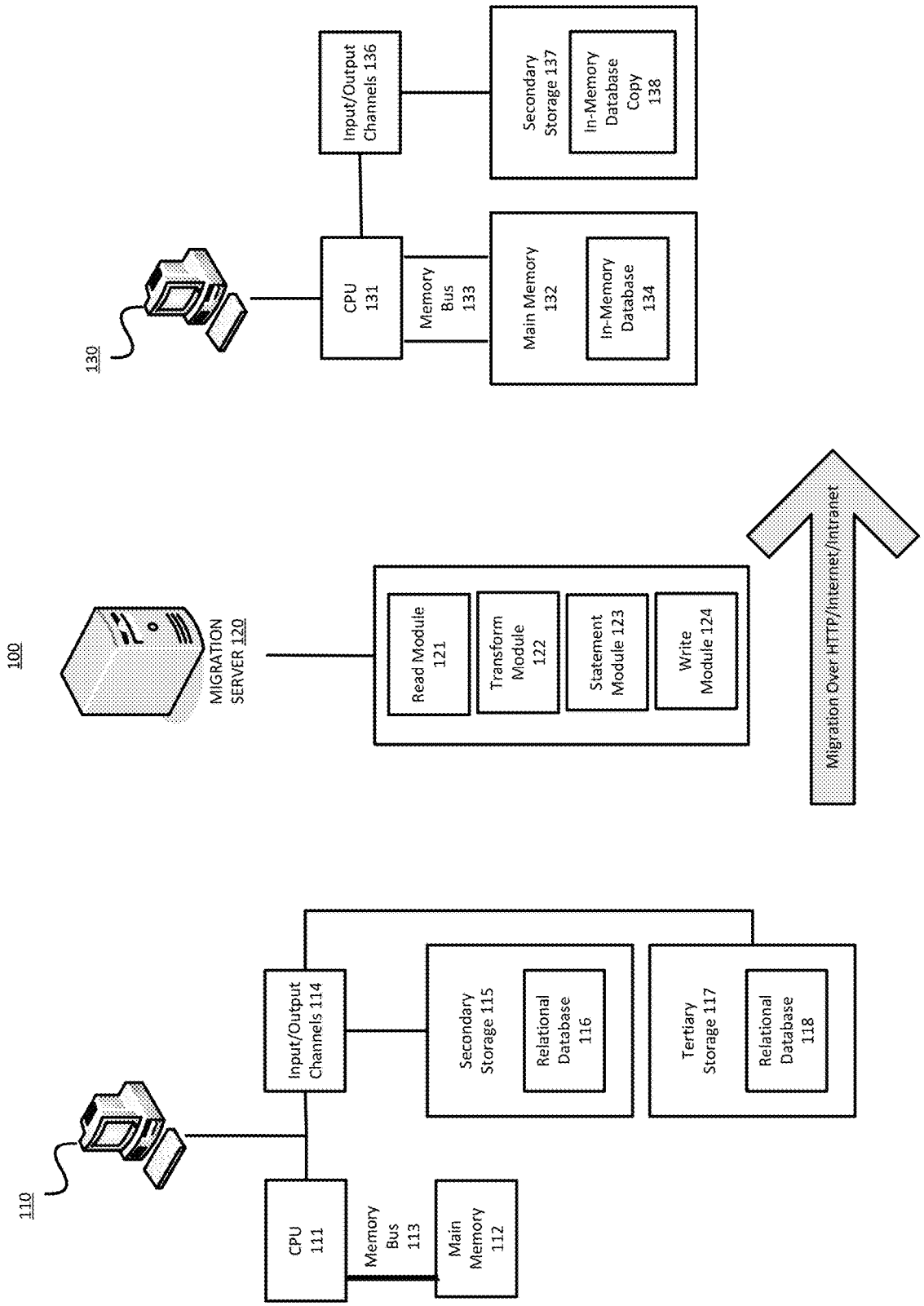
FIG. 1 is a block diagram illustrating the migration of data from a source computer system to a target computer system containing an in-memory database according to an example embodiment of the present invention.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The embodiments are directed to systems and methods for database migration. In an example embodiment, the database migration techniques may include execution modules having a first connection to a source database and a second connection to a target database. Orchestration modules may be adapted to identify first and second subsets of statements from a single storage table. In addition, the first and second subsets of statements are executed by the execution modules during an uptime period of the source database.

Thus, the embodiments provide a database migration framework having asynchronous SQL execution during zero downtime database migration. For example, embodiments provide a system and method to migrate relational databases, or portions thereof, to in-memory databases. In an example embodiment, the database migration techniques may include a first connection to a relational database, a second connection to an in-memory database, and a migration framework there-between.

In-memory databases are located within the main memory of a computer system or other device, which provides the advantage of faster data access and faster program execution. In-memory databases also enable real-time operation on a computer or device, or on multiple computers or devices communicating through wired or network connections. An example of an in-memory database is the SAP® HANA in-memory database system. However, the embodiments are not limited to any particular in-memory database technology.

One benefit of an in-memory database as compared to a relational database is that database coding may be executed directly by the in-memory database, instead of being executed elsewhere, such as an application server or other computing device. As a result, time-consuming communication between the database and the application server or other computing device is avoided. This allows an in-memory database to provide faster data access and faster program execution while handling data structures as complex, or more complex, than a relational database.

In some instances, a copy of the in-memory database may be maintained in secondary storage for non-volatile storage. This is beneficial in that changes to the coding and data structures of the in-memory database may be retained in the event the contents of the main memory are cleared or otherwise lost, such as, for example, when power is no longer provided to a host computing device.

Throughout the discussion that follows, reference will be made to "statement(s)." Here, a statement may refer to any instructions or commands of a programming language adapted to manage data stored in a database. Example statements included DDL, DML, SQL and the like.

An increasing number of database users are expected to migrate their database systems to in-memory systems, such as SAP® HANA. However, the conversion from relational databases to in-memory databases typically has disadvantages. For example, using existing solutions, statements may be generated using ABAP. However, such statements are executed on the backend device's operating system (OS) because the ABAP system is suspended during the upgrade or migration. The computation of statements in ABAP is more convenient than in the OS tool, as the ABAP system is designed to operate on tables and compute table content.

As a result, errors may occur during execution, and restart logic may be needed. For various reasons, the execution of single, selected, or even all statements may fail. Example statements include create object, drop object, grant permission, revoke permission, etc. In such cases, the logic of the process tools may be to issue an error message, let the administrator resolve the problem, and/or offer a "continue" or "repeat action." Here, only statements which had not yet been performed need to be executed. Statements may also be executed in groups.

A common disadvantage of conventional conversion processes is prolonged system downtime. The terms uptime and downtime will be used herein to describe a functional state of a system as well as the accessibility of the system by one or more users. Thus, a system can only be operating and accessible during uptime, but a system can have downtime and may not be accessible by a typical user.

FIG. 1 is a block diagram illustrating the migration of data from a source computer system containing a relational database to a target computer system containing an in-memory database according to an example embodiment. As shown in FIG. 1, migration system 100 includes original computer system 110, migration server 120, and target computer system 130.

Throughout the disclosure, migration between a source relational database and a target in-memory database is described. However, the source and target databases are examples, and the migration systems and methods may be applied to other database platforms. In addition, the migration techniques described herein are not limited to migrating one relational database to one in-memory database. One or multiple relational databases, or specific portions thereof, may be migrated to separate in-memory databases, consolidated into one in-memory database, or segregated into multiple in-memory databases.

Original computer system 110 contains at least one relational database and target computer system 130 includes at least one computer or other device containing an in-memory database according to an example embodiment. Original computer system 110 includes a computer system having a central processing unit (CPU) 111 and main memory 112 directly accessible to CPU 111 via memory bus 113. The CPU 111 utilizes input/output channels 114 to communicate with secondary storage 115 and tertiary storage 117. Secondary storage 115 may include hard disk drives or other mass data storage devices, and tertiary storage 117 may include including compact discs, flash memory drives, removable hard disk drives, magnetic tape drives, or other removable mass data storage media.

Computer system 110 contains at least one relational database. As shown in FIG. 1, relational database 116 is stored in secondary storage 105, and relational database 118 is stored in tertiary storage 117. However, multiple relational databases can be stored in secondary storage 115 and tertiary storage 117, and FIG. 1 should not be considered as limiting the disclosure in this manner.

One or more of the relational databases contained in secondary storage 116 and one or more of the relational databases stored in tertiary storage 117 may be migrated to target computer system 130. Additionally, only selected portions of these relational databases may be migrated. Alternatively, multiple relational databases, or portions thereof, may be combined to form a single in-memory database. Whether one or more of the relational databases stored in original computer system 110 are migrated may be determined based on the design needs and objectives to be accomplished. Furthermore, whether only portions of the relational databases are migrated, or the relational databases are migrated in their entirety, is similarly determined by design needs and objectives.

As illustrated in FIG. 1, the relational databases are migrated to target computer system 130. Target computer system 130 includes at least one computer or device having a CPU 131 and a main memory 132 directly accessible to CPU 131 via memory bus 133. Target computer system 130 further includes a secondary storage 137, in communication with the CPU 131 via input/output channels 136. The at least one computer or device comprising target computer system 130 may be a server, a desktop computer, a laptop computer, a tablet computer, a smartphone, a personal digital assistant, a palmtop computer, or other portable computing device, or any combination of these devices. If multiple devices are included in target computer system 130, data communication between the devices can be implemented using wired, wireless, or network connections.

Upon completion of migration, the relational databases of original computer system 110, or portions thereof, may be contained as in-memory databases in main memory 132 of target computer system 130. This is shown in FIG. 1 as in-memory database 134, but this disclosure is not limited to one in-memory database, and multiple in-memory databases may be generated as a result of the migration. The in-memory database may also be copied into secondary storage 137 of target computer system 130, as indicated by numeral 138, to allow for non-volatile storage of the in-memory database 134. In-memory database copy 138 may be kept current with updates and other changes made to in-memory database 114. Once the migration is completed, the in-memory database 134 may be accessed by the target computer system 130 or any other device in wired, wireless, or network communication with the target computer system 130.

Migration server 120 may include numerous modules to implement the migration functions. Among these modules, are read module 121, transform module 122, statement module 123, and write module 124. During a migration procedure, read module 121 may retrieve the one or more portions of the relational database to be transmitted to an in-memory database. Transform module 122 may execute any needed transformations to the data retrieved form a relational database. Here, statement module 123 may implement statement execution, and achieve zero downtime database migration. After completion of the transformations and statement executions, write module 124 may transmit the data to an in-memory database at target computer system 130.

Figure 2:
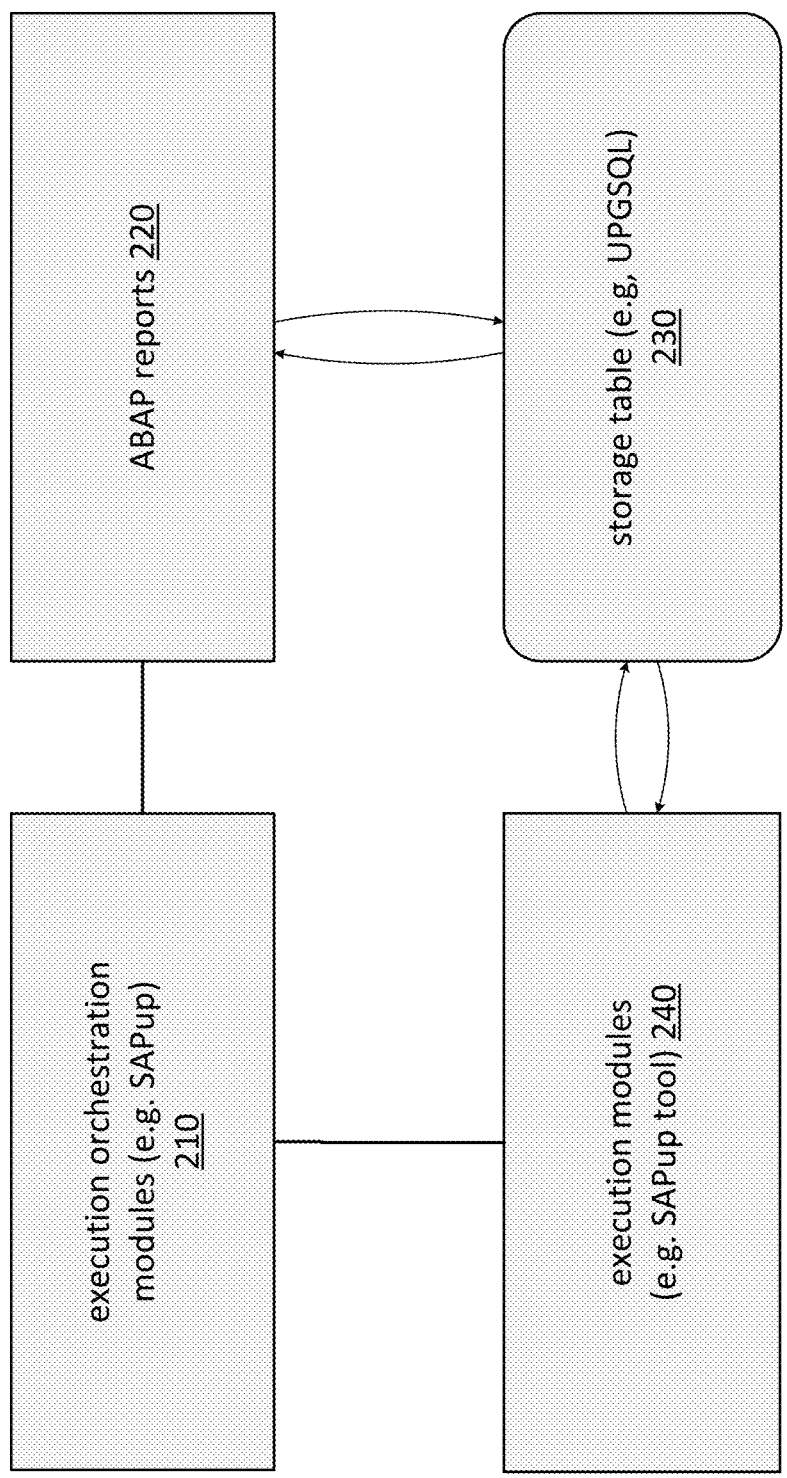
FIG. 2 is a block diagram illustrating communications architecture between components of the database migration system according to an example embodiment of the present invention.

FIG. 2 is a block diagram illustrating communications architecture between components of the database migration tool 200 according to an example embodiment. Here, a single table is used to store statements. In addition, a single tool is configured to execute the stored statements. The database migration tool 200 includes execution orchestration modules 210 (e.g., SAPup), ABAP reports 220, a single storage table 230 (e.g, UPGSQL), and execution modules 240.

The execution orchestration modules 210 may retrieve one or more ABAP reports 220 to generate statements. The generated statements may be stored at a single storage table 230. Alternatively, ABAP reports 220 may generate statements for storage at storage table 230 (e.g., a change recording and replay (CRR) instruction). In addition, the execution orchestration modules 210 may instruct the execution modules 240 to execute one or more of the statements, or a set of statements, stored within storage table 230.

The execution orchestration modules 210 may not have a database connection, but rather may access source and target databases through the execution modules 240. Moreover, the execution modules 240 may maintain multiple parallel database connections with either and/or both of the source and target databases. Thus, the orchestration modules 210 do not have to be designed to internally support database connections.

One or more statements may be retrieved from the single storage table 230 for execution. For example, a "statement" may define a single statement to be executed; a "task" may define a set of statements, which may be processes by one step in the process execution; a "statement group" may define an option to group statements which are executed, committed, and/or deleted from the table as a group (i.e., not statement individually); and a "sequence" may define a sequence, in which the statements shall be executed. In each of these statement types, an "object" may refer to a database object referenced in a statement. Also a "process ID" of the database migration system is operating the statement written to a field, and used to reserve statements for one instance of the system in case parallelization is used.

Using the example migration tool 200, a variety of instruction statements may be stored and/or executed. In addition, the execution modules 240 of the migration tool 200 may support multiple migration requests in parallel. For example, the database migration tool 200 may connect to source and target databases, read statements in groups for the configured TASK from storage table 230, order the statements by sequence number, and execute them. If the execution is successful, the executed statements may be deleted from the single storage table 230. As the migration tool 200 utilizes execution modules 240 to connect with source and target databases, it is database platform independent. Moreover, the example database migration system may be used to ensure that statements may only be changed by database user (i.e., not OS users).

Figure 3:
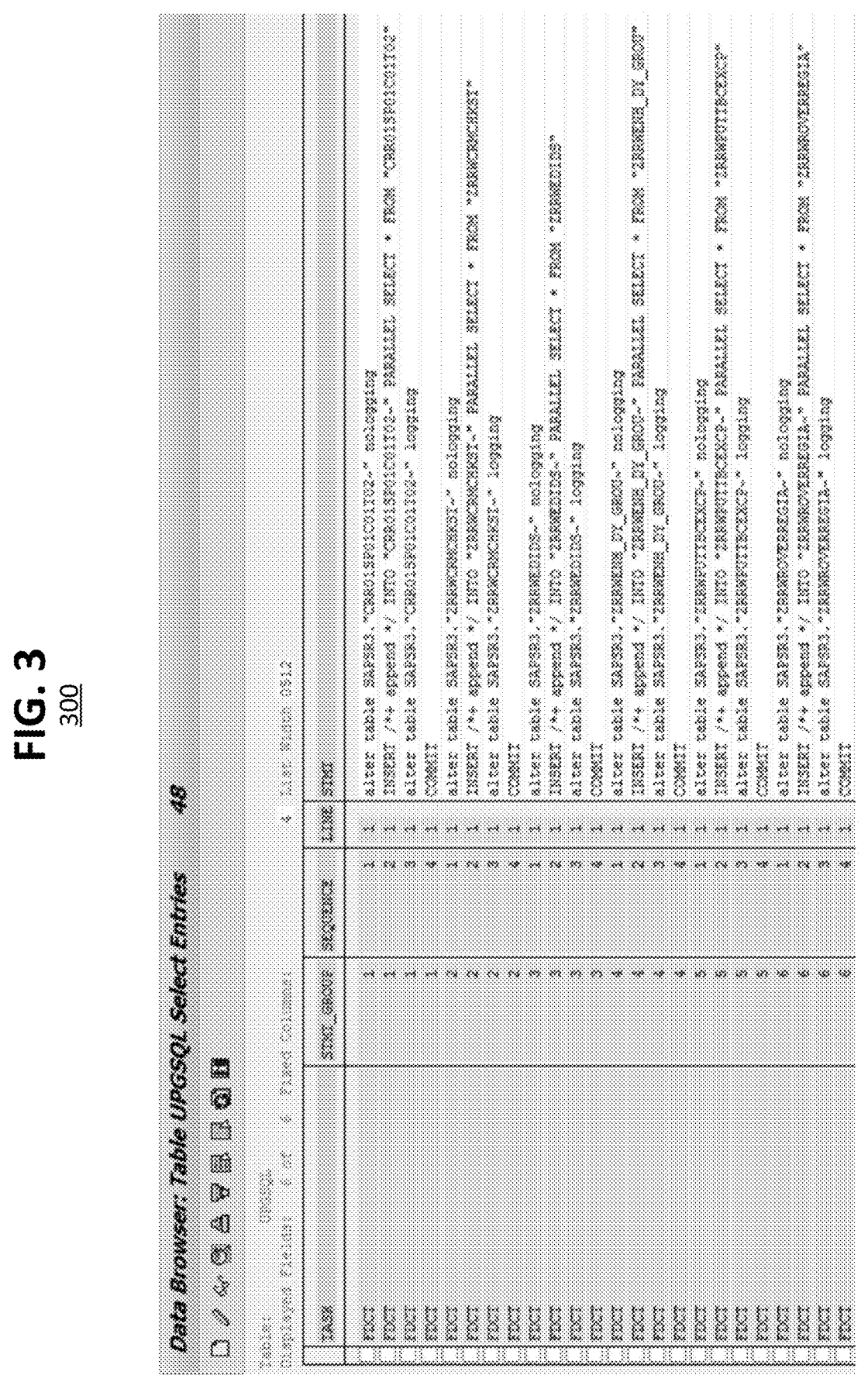

FIG. 3 is a representative view illustrating an example storage table 300 according to an example embodiment. As shown in FIG. 3, the example storage table 300 identifies the task, group, and sequence for each statement. In this example storage table 300, a "COMMIT" is written after each statement group.

Figure 4:
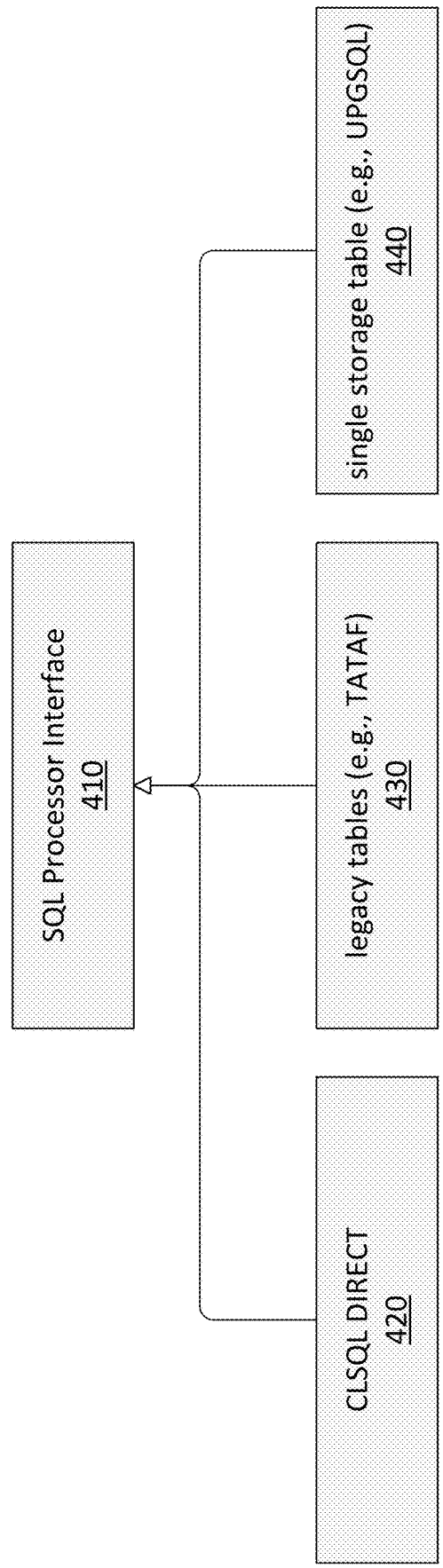
FIG. 4 is a block diagram illustrating a processor statement interface according to an example embodiment of the present invention.

FIG. 4 is a block diagram illustrating s processor statement interface 400 according to an example embodiment. As shown in FIG. 4, the processor interface 410 may be adapted to interface with a variety of database systems. For example, CLSQL direct 420 is a database interface that may access a variety of SQL database engines. CLSQL is a SQL interface for Common Lisp, a type of Lisp programming language. Similarly, legacy tables such as SAP's TATAF tables may also be accessed by the processor interface 410. Lastly, the single storage table 440 (e.g., USGSQL) may also be accessed by the processor interface 410.

Figure 5:
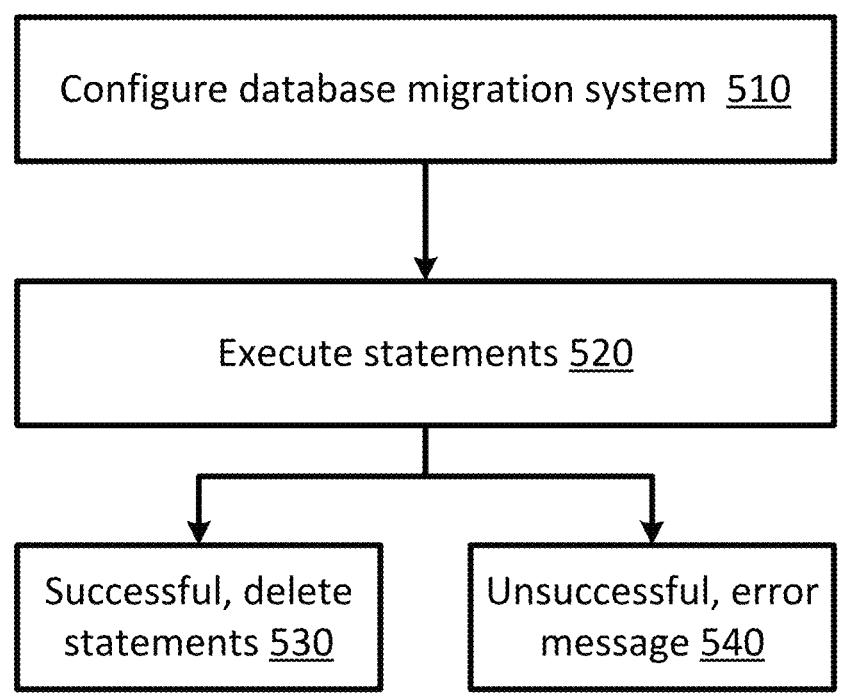
FIG. 5 is a flow chart illustrating a method for the migration of a source database to a target database according to an example embodiment of the present invention.

FIG. 5 is a flow chart of a method 500 for utilizing the migration system according to an example embodiment.

At 510, the database migration system may be configured. For example, the execution orchestration modules 210 may launch one or more of the execution modules 240. Here, the execution modules 240 do not require synchronization with the source or target databases, but rather synchronize via the storage table 230. Instead, the execution modules may establish communication connections with the source and/or target databases. At 510, the execution orchestration modules 210 may also specify one or more statements to be retrieved from the storage table (e.g., 230 or 440) and executed by the execution modules 240.

Next, at 520, the specified statements may be executed. For example, the execution modules 240 may execute one or more statements or one or more statement groups. During execution, the execution modules 240 may determine the order of execution or the statements may be executed according to a sequence. If the statements do not do an "auto-COMMIT", a "COMMIT" can be written to the statement group as well. In some instances, periodic commits may be executed after the last statement of a group. As statements are updated, the "process ID" field may also be updated.

In some instances, the execution of a statement group is not automatically completed with a COMMIT. When a COMMIT statement is required, it may be added as the last statement of a group. However, if one of the statements of a group fails, a ROLLBACK may be performed automatically.

At 530, if all statements are executed successfully, the statements are deleted from the storage table 230. However, if one or more errors occur during statement execution, the execution modules 240 may be suspended and error messages may be generated to identify the error(s), at 540. Upon resolution of the error(s), the database migration system may be re-launched.

Using embodiments of the invention, asynchronous SQL execution during zero downtime database migration may be achieved. Once the migration process is complete, many benefits of in-memory databases may be realized. For example, in-memory databases may deliver increased data access speed compared to relational databases stored outside of main memory, and consequently may provide faster program execution. Real-time program execution may also be implemented due to the increased speed of program execution. In-memory databases may also be accessed from desktop computers or portable devices such as laptop or tablet computers and smartphones, which may be placed in data communication using wired, wireless, or network connections.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

We claim:

1. A database migration system for more rapidly migrating data from a source database to a target database, comprising:
   one or more processors; and
   memory storing a plurality of integrated programs for execution by the one or more processors, one of the plurality of integrated programs including:
   execution modules having a first connection to the source database and a second connection to the target database, the source database and the target database being different database types, the execution modules being executed by a migration server intermediate the source database and the target database;
   orchestration modules adapted to identify first and second subsets of statements from a single storage table, each of the first and second subsets of statements comprising at least one statement and a corresponding sequence number, the first and second subsets of statements being different types of statements stored in the single storage table; and
   ordering the first and second subsets of statements according to their corresponding sequence numbers;
   wherein:
   the first and second subsets of statements are asynchronously executed by the execution modules in response to instructions from the orchestration module according to an ordering of their corresponding sequence numbers during an uptime period of the source database without requiring the source database to enter a downtime period during migration;
   the first and second subsets of statements are deleted from the single storage table together at the same time if and after all such statements are successfully executed;
   at least one Advanced Business Application Programming (ABAP) report is retrieved, by the orchestration modules, to generate the first subset of statements and the second subset of statements;
   the orchestration modules and the execution modules are both executed by a migration server intermediate the source database and the target database;
   the orchestration modules do not have a connection to either of the source database and the target database and access the source database and the target database through the execution modules.

2. The database migration system of claim 1, further comprising a statement generation section.

3. The database migration system of claim 2, wherein statements generated by the statement generation section are stored in the single storage table.

4. The database migration system of claim 1, wherein the source database is a relational database storing data on hard disk drives.

5. The database migration system of claim 4, wherein the target database is an in-memory database.

6. The database migration system of claim 1, wherein the execution modules maintain multiple parallel database connections with the source and target databases.

7. The database migration system of claim 1, wherein multiple relational databases are consolidated into a single in-memory database.

8. A method for more rapidly migrating data from a source database to a target database, comprising:
   establishing, by execution modules, a first connection to the source database and a second connection to a target database, the source database and the target database being different database types;
   retrieving, by orchestration modules, at least one Advanced Business Application Programming (ABAP) report;
   generating, by the orchestration modules using the retrieved at least one ABAP report, first and second subsets of statements, each of the first and second subsets of statements comprising at least one statement and a corresponding sequence number, the first and second subsets of statements being different types of statements stored in a single storage table, the orchestration modules being executed by a migration server intermediate the source database and the target database;
   asynchronously executing, by the execution modules in response to instructions from the orchestration modules, the first and second subsets of statements according to an ordering of their corresponding sequence numbers during an uptime period of the source database without requiring the source database to enter a downtime period, the execution modules being executed by the migration server;
   wherein the orchestration modules do not have a connection to either of the source database and the target database and access the source database and the target database through the execution modules.

9. The method for database migration of claim 8, further comprising a statement generation section.

10. The method for database migration of claim 9, wherein statements generated by the statement generation section are stored in the single storage table.

11. The method for database migration of claim 8, wherein the source database is a relational database.

12. The method for database migration of claim 8, wherein the target database is an in-memory database.

13. The method for database migration of claim 8, wherein the execution modules maintain multiple parallel database connections with the source and target databases.

14. The method for database migration of claim 8, wherein multiple relational databases are consolidated into a single in-memory database.

15. A non-transitory computer readable storage medium for more rapidly migrating data from a source database to a target database, the computer readable storage medium storing one or more programs configured to be executed by a processor, the one or more programs comprising instructions for:
   establishing, by execution modules, a first connection to the source database and a second connection to the target database, the source database and the target database being different database types, the execution modules being executed by a migration server intermediate the source database and the target database;

retrieving, by orchestration modules, at least one Advanced Business Application Programming (ABAP) report; and generating, by the orchestration modules using the retrieved at least one ABAP report, first and second subsets of statements, each of the first and second subsets of statements comprising at least one statement and a corresponding sequence number, the first and second subsets of statements being different types of statements stored in a single storage table, the orchestration modules being executed by the migration server;

wherein:
the first and second subsets of statements are asynchronously executed by the execution modules in response to instructions from the orchestration module according an ordering of their corresponding sequence numbers during an uptime period of the source database without requiring the source database to enter a downtime period during migration;

the first and second subsets of statements are deleted from the single storage table at the same time if and after all such statements are successfully executed;

the orchestration modules do not have a connection to either of the source database and the target database and access the source database and the target database through the execution modules.

16. The computer readable storage medium of claim 15, wherein further comprising a statement generation section.

17. The computer readable storage medium of claim 16, wherein statements generated by the statement generation section are stored in the single storage table.

18. The computer readable storage medium of claim 15, wherein the source database is a relational database.

19. The computer readable storage medium of claim 15, wherein the target database is an in-memory database.

20. The computer readable storage medium of claim 15, the execution modules maintain multiple parallel database connections with the source and target databases.

21. The computer readable storage medium of claim 15, wherein multiple relational databases are consolidated into a single in-memory database.

* * * * *